3,280,398
ELECTRIC MOTOR AND WINDING CIRCUIT ARRANGEMENTS
Georges Robert Pierre Marie, 16 Rue de Varize, Paris, France
Filed Jan. 6, 1964, Ser. No. 335,753
Claims priority, application France, Jan. 10, 1963, 920,971, Patent 1,371,775; Dec. 30, 1963, 958,788, Patent 1,388,867
2 Claims. (Cl. 318—166)

The present invention concerns electric motors, particularly electric motors used as servomotors and winding circuit arrangements in said motors.

The motors of the invention are variable reluctance motors comprising a high permeability unwound rotor having an odd number of projecting poles, a four-pole stator, a set of two main coils and one additonal coil wound around each stator pole, said coils having a reluctance varying according to the position of the rotor with respect to the stator poles from a minimal to a maximal value, each of said coils being associated with a capacitor and forming therewith a resonant circuit tuned to the frequency of the feed current of the motor when the coil reluctance has its mean value, means for connecting the main coils of a first pair of opposite stator poles in a first bridge arrangement and the additional coils of the second pair of opposite stator poles in one diagonal of said first bridge arrangement, means for connecting the main coils of the second pair of opposite stator poles in a second bridge arrangement and the additional coils of the first pair of opposite stator poles in one diagonal of said second bridge arrangement, and means for feeding in phase quadrature the other diagonal of said first and second bridge arrangements.

Due to the fact that the rotor has an odd number of projecting poles while the stator is four-poled, the gaps in front of two opposite stator poles are symmetrical when the gaps in front of the two other opposite stator poles are antisymmetrical. Symmetrical gaps are geometrically symmetrical gaps with respect to any symmetry axis of the stator. Antisymmetrical gaps are gaps deriving from one another by a geometrical symmetry with respect to any symmetry axis of the stator followed by a rotation of $\pi/n$ where $n$ is the odd number of rotor poles.

Figure 1:
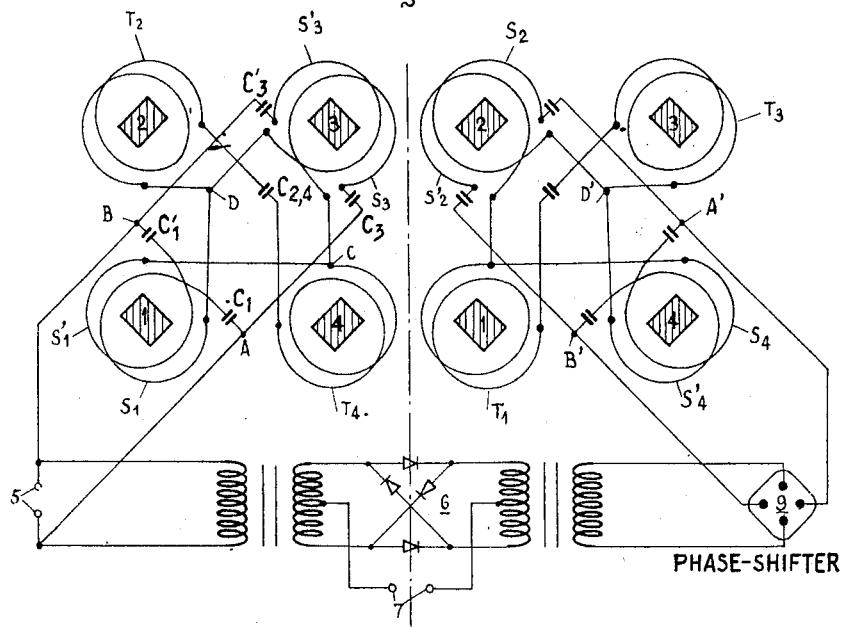
Figure 2:
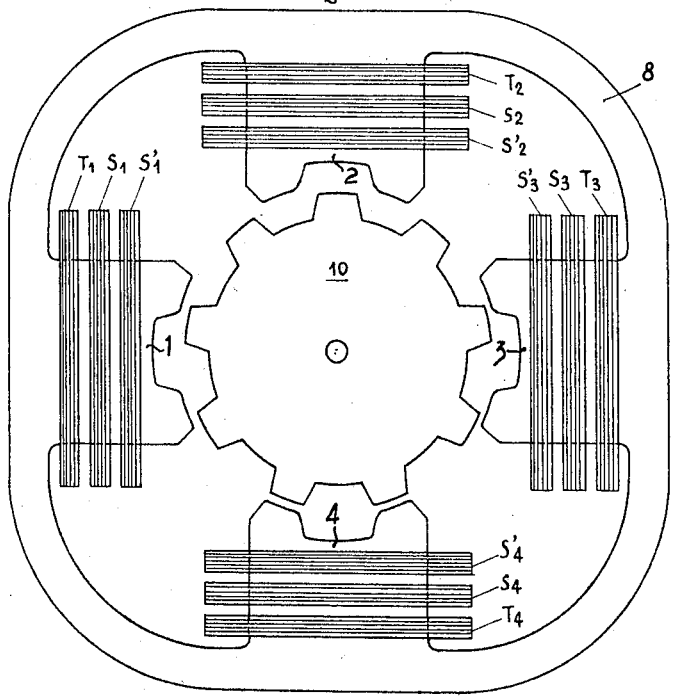

The novel features which are believed to be characteristic of the invention, both as to its organization and method of operation, together with further objects and advantages thereof, will be better understood from the following description considered in connection with the accompanying drawings in which:

FIG. 1 is a schematic representation of the motor in which the stator poles are shown at the apices of a square and the windings are given one or two turns for the purpose of operation explanations; and FIG. 2 is a simplified representation of one motor according to the invention.

Referring now to FIG. 1, the stator 8, the four poles 1–4 and the rotor 10 are of conventional construction, i.e. consisting of stacked magnetic laminations.

Rotor 10 has nine projecting poles separated by hollows. It exhibits a repetition symmetry of order nine, that is it coincides with itself through a rotation of any multiple of $2\pi/9$. The poles of the stator have two projecting teeth separated by a hollow, the angular distance between the two teeth of a stator pole being equal to the angular distance between subsequent rotor poles. It results that, for certain positions of the rotor, the teeth of the stator pole and the teeth of the rotor register with one another which, in FIG. 2, occurs for pole 4.

At pole 2, the rotor-stator gap is minimal, at pole 4 it is maximal; it has its mean value at poles 1 and 3. According to the definition above set forth, gaps in front of poles 1 and 3 are symmetrical and gaps in front of poles 2 and 4 are antisymmetrical.

Poles 1–4 are each surrounded by two main coils S and one additional coil T. In FIGS. 1 and 2, the subscripts associated with letter S or T refer to the number of the pole. Coils $S_1$, $S_1'$, $S_3$, $S_3'$ are arranged in a first bridge arrangement and coils $S_2$, $S_2'$, $S_4$, $S_4'$ in a second bridge arrangement. Coils $T_2$ and $T_4$ are serially connected in the diagonal of the bridge ($S_1$, $S_1'$, $S_3$, $S_3'$) and coils $T_1$ and $T_3$ are serially connected in the diagonal of the bridge ($S_2$, $S_2'$, $S_4$, $S_4'$). These two bridges are fed across the other diagonal by an alternating current the frequency of which is preferably chosen higher than the usual mains frequency in order to make easier the current phase-shifts necessary for ensuring an efficient operation of the motor. Frequencies in the range from 700 to 1000 cycles per second are quite suitable. In FIG. 1, reference numeral 5 designates the terminals of the motor current source, A, B, C, D the apices of impedance bridge ($S_1$, $S_1'$, $S_3$, $S_3'$) and A', B' C' D' the apices of impedance bridge ($S_2$, $S_2'$, $S_4$, $S_4'$).

All coils S are identical but have an impedance depending upon the instantaneous gap between the rotor and the corresponding stator pole piece. If the gaps in front of pole pieces 1 and 3 are symmetrical, no current is flowing through coils $T_2$ and $T_4$. If the gap in front of pole piece 1 is minimal and the gap in front of pole piece 3 maximal, the reluctance of coils $S_1$ and $S_1'$ is larger than that of coils $S_3$ and $S_3'$ that is the inductance of coils $S_1$ and $S_1'$ is smaller than that of coils $S_3$ and $S_3'$ and current flows in coils $T_2$ and $T_4$. Coils $T_2$ and $T_4$ are serially and subtractively connected, or, in other words, the magnetic fields developed by poles 2 and 4 respectively induced by coils $T_2$ and $T_4$ are colinear and have opposite directions.

If the gap in front of pole piece 3 is minimal and the gap in front of pole piece 1 maximal, the direction of current in coils $T_2$ and $T_4$ and the direction of the magnetic field they produce are reversed.

$C_1$, $C_1'$, $C_3$, $C_3'$ and $C_{24}$ are capacitors respectively serially connected with coil $S_1$ in branch AD, coil $S_1'$ in branch BC, coil $S_3$ in branch AC, coil $S_3'$ in branch BD and coils $T_2$ and $T_4$ in diagonal CD. These capacitors form with the associated coil a series resonant circuit which is tuned to the feed current frequency when the gap in front of the pole carrying said associated coil has its mean value. Then, it results from the general properties of the impedance bridges that the current in diagonal BD, if it is not zero, is in phase quadrature with the voltage of the source and that, when the current in the diagonal branch is zero, the currents in coils $S_1$, $S_1'$, $S_3$, $S_3'$ are cophasal with the voltage of the source.

If one takes as current intensity complex unit, the current in coils $S_1$, $S_1'$, $S_3$, $S_3'$ which are identical when the minimal gap is in front of pole piece 1, the current intensity complex values are respectively $j\beta$ and $-j\beta$ in coils $T_2$ and $T_4$ ($\beta$ being a constant depending on the impedance ratio of coils T and coils S); the current intensities in said coils becomes zero when said minimal gap is in front of pole piece 2, $-j\beta$ and $j\beta$ when it is in front of pole piece 3 and once more zero when it is in front of pole piece 4.

The set of coils shown in the right-hand side of FIG. 1 represents the second impedance bridge. It derives from the first by a rotation of $\pi/2$ of the stator, the rotor remaining stationary, that is by a substitution of subscripts 2 and 4 in coils S and 3 and 1 in coils T for 1 and 3 in coils S and 2 and 4 in coils T. Furthermore the feed current of the second impedance bridge is phase-shifted by $\pi/2$ with respect to the feed current of the first impedance bridge and may have a different intensity.

Denoting by $j\alpha$ the ratio between the feed currents of the second and first impedance bridges which are assumed to be in phase quadrature and reminding that the current in coils $S_1$, $S_1'$, $S_3$, $S_3'$, when the minimal gap is in front of pole piece 4 or 2 is taken as complex unit, the current in coils $S_2$, $S_2'$, $S_4$, $S_4'$ when the minimal gap is in front of pole piece 1 or 3 is equal to $j\alpha$ and the currents in coil $T_3$ and $T_1$ is zero when the minimal gap is in front of pole pieces 1 or 3, respectively equal to $\mp\alpha\beta$ when the minimal gap is in front of pole piece 2 and respectively equal to $\pm\alpha\beta$ when the minimal gap is in front of pole piece 4.

By superimposing the states of the left-hand and right-hand sides of FIG. 1, the following results can be tabulated:

| Position of the minimal gap in front of pole piece | 1 | 2 | 3 | 4 |
|---|---|---|---|---|
| Currents in $S_1$, $S_1'$, $S_3$, $S_3'$ | 1 | 1 | 1 | 1 |
| Currents in $S_2$, $S_2'$, $S_4$, $S_4'$ | $j\alpha$ | $j\alpha$ | $j\alpha$ | $j\alpha$ |
| Current in $T_1$ | 0 | $\alpha\beta$ | 0 | $-\alpha\beta$ |
| Current in $T_2$ | $j\beta$ | 0 | $-j\beta$ | 0 |
| Current in $T_3$ | 0 | $-\alpha\beta$ | 0 | $+\alpha\beta$ |
| Current in $T_4$ | $-j\beta$ | 0 | $j\beta$ | 0 |

When the minimal gap is in front of pole 1 and the maximal gap in front of pole 3 for example, the currents in $S_2$ and $S_2'$ ($j\alpha$) and the current in $T_2$ ($j\beta$) are cophasal and apply an attractive magnetomotive force to the rotor and the currents in $S_4$ and $S_4'$ ($j\alpha$) and the current in $T_4$ ($-j\beta$) are in phase opposition and apply a repulsive magnetomotive force to the rotor. Similar explanations can be given for the other positions of the minimal gap.

It results from the foregoing that the motor of the invention differs from the conventional two-phase motors often used as servomotors in that the rotating field is always circular whichever be the error signal controlling the motor while it is elliptical in two-phase motors. Consequently when the error signal vanishes, the whole of the rotating field vanishes as its modules becomes zero instead of degenerating from a rotating to a rectilinear field as in conventional two-phase motors. Furthermore, the rotative speed of the motor is significantly decreased as compared to two-phase motors, the speed reduction ratio being nine in the embodiment which was disclosed above.

Referring again to FIG. 1, the error signal is applied to one input 7 of a ring modulator 6 which receives as current carrier the feed current of the motor. The output signal of ring modulator 6 is applied to the second impedance bridge through phase-quadrature network 9.

It will be obvious to the man skilled in the art that, within the scope of the invention, many other variants of embodiment may be imagined. For instance the hollow of stator poles may be omitted and the rotor may be given any odd number of teeth.

What I claim is:
1. Variable reluctance motor comprising a high permeability unwounded rotor having an odd number of projecting poles, a four-pole stator, a set of two main coils and one additional coil wound around each stator pole, said coils having a reluctance varying according to the position of the rotor with respect to the stator poles from a minimal to a maximal value, each of said coils being associated with a capacitor and forming therewith a resonant circuit tuned to the frequency of the feed current of the motor when the coil reluctance has its means value, means for connecting the main coils of a first pair of opposite stator poles in a first bridge arrangement and the additional coils of the second pair of opposite stator poles in one diagonal of said first bridge arrangement, means for connecting the main coils of the second pair of opposite stator poles in a second bridge arrangement and the additional coils of the first pair of opposite stator poles in one diagonal of said second bridge arrangement, and means for feeding in phase quadrature the other diagonal of said first and second bridge arrangements.

2. Variable reluctance servo-motor comprising a high permeability unwound rotor having an odd number of projecting poles, a four-pole stator, a set of two main coils and one additional coil wound around each stator pole, said coils having a reluctance varying accordinge to the position of the rotor with respect to the stator poles from a minimal to a maximal value, each of said coils being associated with a capacitor and forming therewith a resonant circuit tuned to the frequency of the feed current of the motor when the coil reluctance has its mean value, means for connecting the main coils of a first pair of opposite stator poles in a first bridge arragement and the additional coils of the second pair of opposite stator poles in one diagonal of said first bridge arrangement, means for connecting the main coils of the second pair of opposite stator poles in a second bridge arrangement and the additional coils of the first pair of opposite stator poles in one diagonal of said second bridge arrangement, a current source for feeding the diagonal of the first bridge arrangement, a signal source, a symmetrical modulator having two inputs connected to said current source and to said signal source and an output, a phase-quadrature network inserted between said output and the diagonal of the second bridge arrangement.

References Cited by the Examiner
UNITED STATES PATENTS

| | | | |
|---|---|---|---|
| 1,959,449 | 5/1934 | Stroller | 310—163 |
| 3,127,555 | 3/1964 | Honore et al. | 323—75 |

ORIS L. RADER, *Primary Examiner.*

G. Z. RUBINSON, *Assistant Examiner.*